US011908158B2

(12) United States Patent
Yu et al.

(10) Patent No.: US 11,908,158 B2
(45) Date of Patent: Feb. 20, 2024

(54) TRANSPARENT DISPLAY SYSTEM, CONTROL METHOD AND CONTROL DEVICE THEREOF

(71) Applicant: INDUSTRIAL TECHNOLOGY RESEARCH INSTITUTE, Hsinchu (TW)

(72) Inventors: Tzu-Yi Yu, Kaohsiung (TW); Hong-Ming Dai, Tainan (TW); Chun-Yen Huang, Changhua (TW); Yu-Hsuan Su, Kaohsiung (TW); Hung-Pin Shih, Hsinchu (TW); Ya-Rou Hsu, Tongxiao Township (TW); Yu-Hsiang Tsai, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/530,686

(22) Filed: Nov. 19, 2021

(65) Prior Publication Data
US 2022/0164979 A1 May 26, 2022

Related U.S. Application Data

(60) Provisional application No. 63/116,166, filed on Nov. 20, 2020.

(51) Int. Cl.
*G06F 3/01* (2006.01)
*G06T 7/70* (2017.01)
*H04N 23/90* (2023.01)

(52) U.S. Cl.
CPC .............. *G06T 7/70* (2017.01); *G06F 3/011* (2013.01); *H04N 23/90* (2023.01)

(58) Field of Classification Search
CPC ............ G06T 7/70; G06F 3/011; H04N 5/247
See application file for complete search history.

(56) References Cited

U.S. PATENT DOCUMENTS 10,732,919 B2  8/2020 Aurongzeb et al.
2015/0302561 A1 10/2015 Pekkucuksen et al.
(Continued)

FOREIGN PATENT DOCUMENTS

CN   107398069 A  11/2017
CN   109388233 A   2/2019
(Continued)

OTHER PUBLICATIONS

Taiwanese Office Action and Search Report dated Jul. 7, 2022 for Application No. 110143178.

*Primary Examiner* — Robert J Michaud
(74) *Attorney, Agent, or Firm* — Birch, Stewart, Kolasch & Birch, LLP

(57) ABSTRACT

A transparent display system, a control method and a control device thereof are provided. The transparent display system includes an information capturing assembly, a transparent display and a control device. The information capturing assembly is used to obtain at least one detection content. The control device includes a detection unit, a resource allocation unit and a recognition unit. The detection unit is used for detecting at least one user in front of a transparent display and at least one target object behind the transparent display according to the detection content. The resource allocation unit is used to obtain a resource allocation according to a detection result of the detection unit. The information capturing assembly obtains at least one recognition content. The recognition unit obtains at least one front side position of the user and at least one back side position of the target object according to the resource allocation.

19 Claims, 13 Drawing Sheets

(56) References Cited

U.S. PATENT DOCUMENTS

| | | |
|---|---|---|
| 2020/0089955 A1* | 3/2020 | Chang .................... G06T 7/246 |
| 2020/0249812 A1 | 8/2020 | Han et al. |
| 2020/0250787 A1 | 8/2020 | Cheng et al. |
| 2022/0236799 A1* | 7/2022 | Berkner-Cieslicki ....................... G06F 3/011 |

FOREIGN PATENT DOCUMENTS

| | | |
|---|---|---|
| CN | 109683774 A | 4/2019 |
| EP | 2 153 410 B1 | 11/2016 |
| TW | 201428324 A | 7/2014 |
| TW | I669703 B | 8/2019 |
| TW | 202009653 A | 3/2020 |
| TW | 202011154 A | 3/2020 |
| TW | 202113753 A | 4/2021 |
| TW | 202117598 A | 5/2021 |
| WO | WO 2020/027451 A1 | 2/2020 |

* cited by examiner

TRANSPARENT DISPLAY SYSTEM, CONTROL METHOD AND CONTROL DEVICE THEREOF

This application claims the benefit of U.S. application Ser. No. 63/116,166, filed Nov. 20, 2020, the disclosure of which is incorporated by reference herein in its entirety.

TECHNICAL FIELD

The disclosure relates in general to a transparent display system, a control method and a control device thereof.

BACKGROUND

With the rapid development of display technology, various displays are invented. For example, the transparent display can display content on a transparent material, so that users can see the target object behind the transparent display and the display content.

The display content can be used to introduce and explain the target object. When the position of the user or the target object relative to the transparent display changes, the sight position of the user on the transparent display will not be the same. The display content must be accurately displayed at the sight position. Especially in the large-size transparent display, it takes a lot of processing resources to accurately display the display content at the sight position.

SUMMARY

The disclosure is related to a transparent display system, a control method and a control device thereof.

According to one embodiment, a transparent display system is provided. The transparent display system includes an information capturing assembly, a transparent display and a control device. The information capturing assembly is configured to obtain at least one detection content. The control device includes a detection unit, a resource allocation unit and a recognition unit. The detection unit is configured to detect at least one user in front of the transparent display and at least one target object behind the transparent display according to the at least one detection content. The resource allocation unit is configured to obtain a resource allocation according to a detection result of the at least one detection content. The information capturing assembly obtains at least one recognition content according to the resource allocation, and the recognition unit obtains at least one front side position of the at least one user and at least one back side position of the at least one target object according to the resource allocation.

According to another embodiment, a control method of a transparent display system is provided. The control method of the transparent display system includes the following steps. At least one user in front of a transparent display and at least one target object behind the transparent display are detected according to at least one detection content. A resource allocation is obtained according to a detection result of the at least one detection content. At least one recognition content is obtained and at least one front side position of the at least one user and at least one back side position of the at least one target object are recognized according to the resource allocation.

According to an alternative embodiment, a control device is provided. The control device includes a detection unit, a resource allocation unit and a recognition unit. The detection unit is configured to detect at least one user in front of the transparent display and at least one target object behind the transparent display according to the at least one detection content. The resource allocation unit is configured to obtain a resource allocation according to a detection result of the at least one detection content. The information capturing assembly obtains at least one recognition content according to the resource allocation, and the recognition unit obtains at least one front side position of the at least one user and at least one back side position of the at least one target object according to the resource allocation.

In order to have a better understanding of the above-mentioned and other aspects of the present disclosure, the following examples are given, and are described in detail as follows in conjunction with the accompanying drawings.

DETAILED DESCRIPTION

Figure 1:
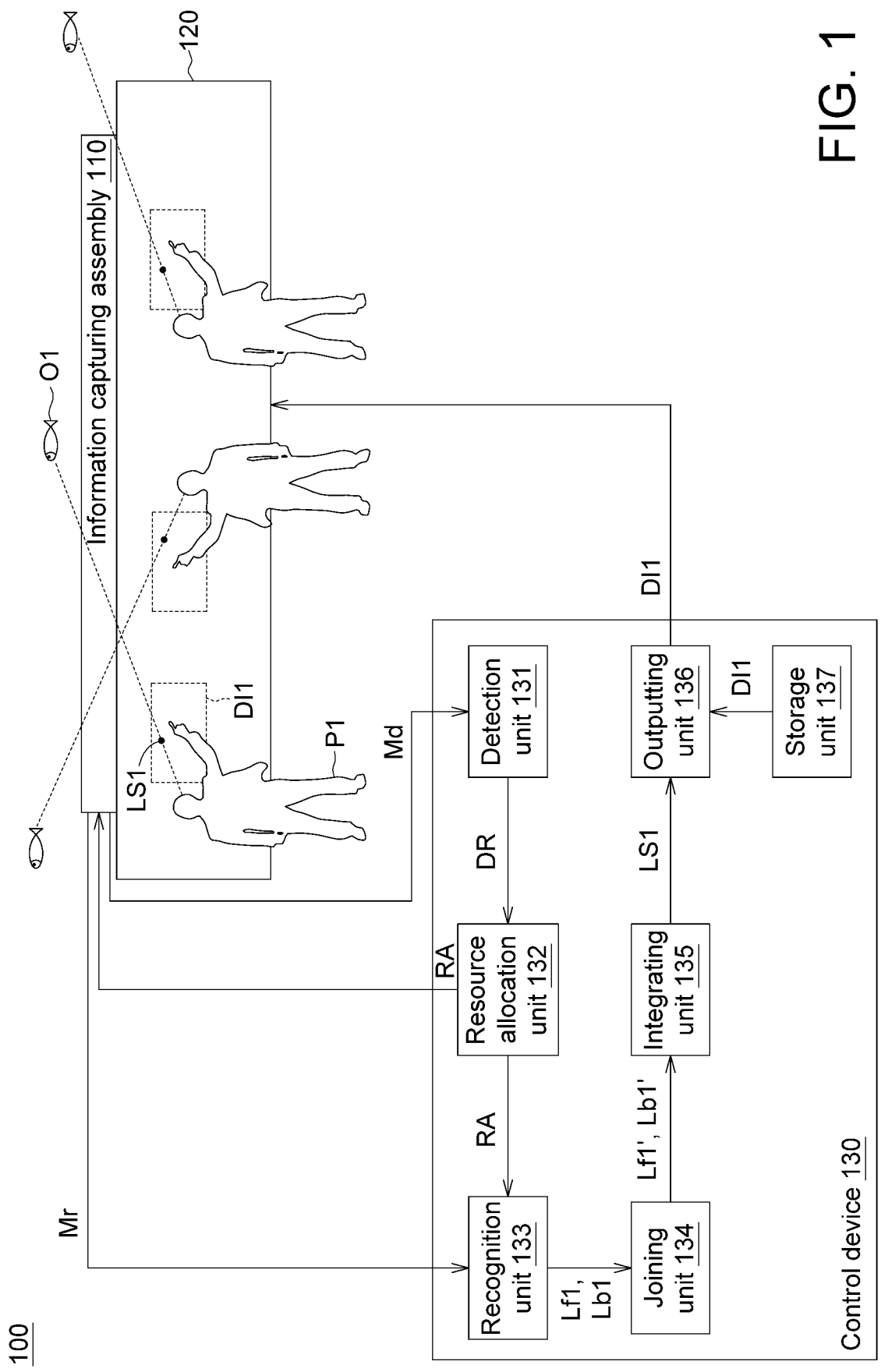
FIG. 1 shows a schematic diagram of a transparent display system according to an embodiment.

Please refer to FIG. 1, which shows a schematic diagram of a transparent display system 100 according to an embodiment. The transparent display system 100 includes an information capturing assembly 110, a transparent display 120 and a control device 130. The information capturing assembly 110 is composed of at least one image capturing unit, at least one infrared sensor, or at least one radar sensor having the same/different resolution, and being the same/different type. The image capturing unit may include, for example, a camera, a video camera, an infrared sensor or a radar sensor. The transparent display 120 is a transparent display panel or a light permeable display panel. The transparent display 120 is, for example, the landscape glass set in the viewing platform or the glass of the water tank in the aquarium. The information capturing assembly 110 is, for example, arranged above or adjacent to the transparent display 120 to obtain at least one user P1 in front of the transparent display 120 and at least one target object O1 behind the transparent display 120. The control device 130 may be, for example, a computer, a server, a cloud computing center, a circuit board, a circuit, a computer program product, a computer-readable recording media or a chip, etc. The control device 130 can analyze the sight position LS1 of the user P1 on the transparent display 120, and display the display content DI1 on the transparent display 120.

In this embodiment, the transparent display 120 may be a large-sized panel or a splicing of several small-sized panels, and the control device 130 uses the resource allocation technology to allocate the processing resources of the information capturing assembly 110, or uses the resource allocation technology to allocate the internal processing resources of the control device 130 to reduce the overall processing resource consumption.

The control device 130 includes a detection unit 131, a resource allocation unit 132, a recognition unit 133, a joining unit 134, an integrating unit 135 and an outputting unit 136. The functions of those components are summarized as follows. The detection unit 131 is used to detect the presence of humans or objects. The resource allocation unit 132 is executed for resource allocation. The recognition unit 133 is used to accurately recognize the location of humans or objects. The joining unit 134 is used to join the recognized locations. The integrating unit 135 is used to perform the coordinate system integration. The outputting unit 136 is used to output various information. In this embodiment, the resource allocation technology is used to allocate the processing resources of the information capturing assembly 110, or allocate the internal processing resources of the control device 130 to reduce the overall processing resource consumption. The detailed description of the operations of those components is illustrated through a flowchart.

Figure 2:
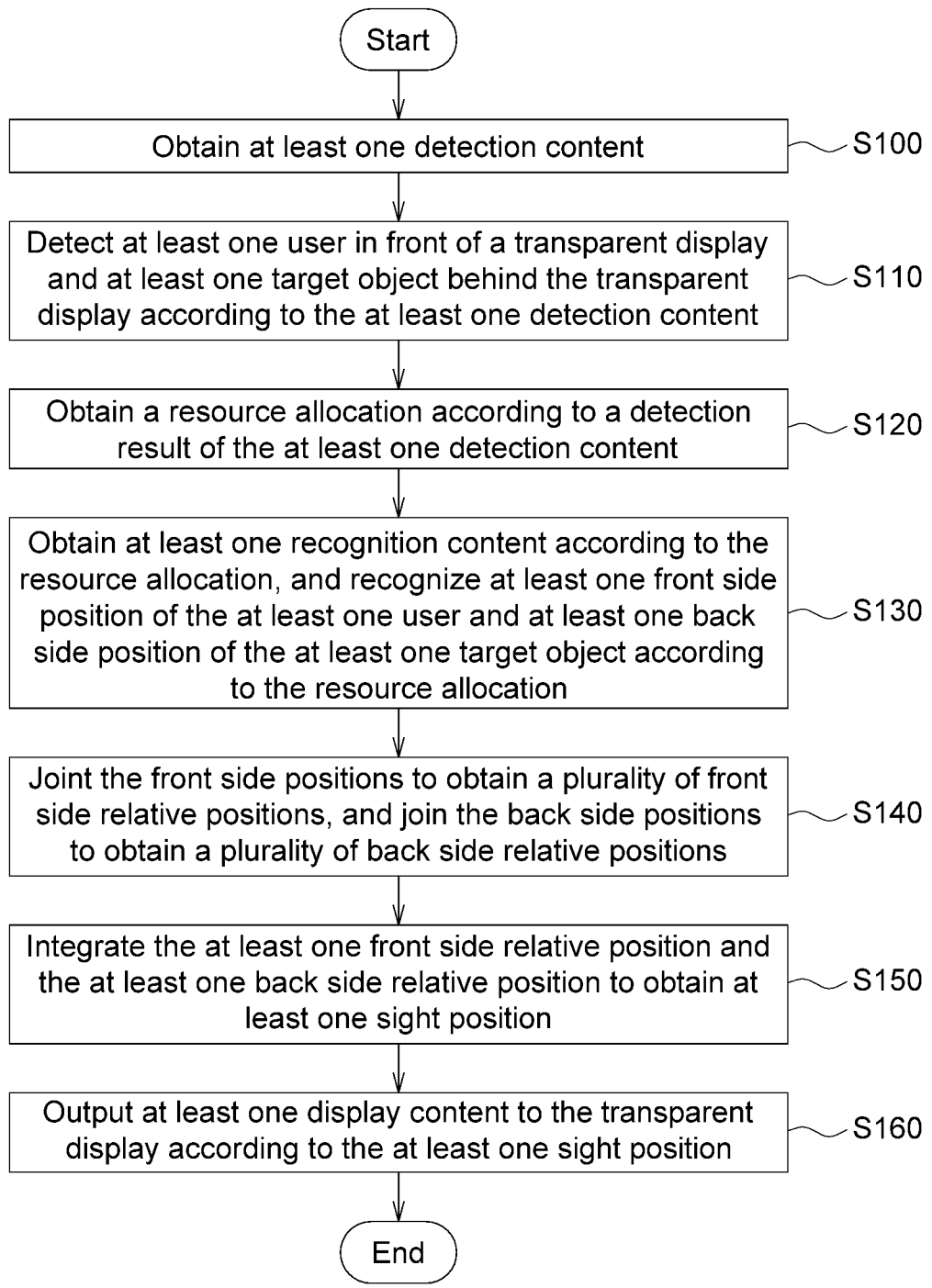
FIG. 2 shows a flowchart of a control method of the transparent display system according to an embodiment.

Please refer to FIG. 2, which shows a flowchart of a control method of the transparent display system 100 according to an embodiment. The control method of the transparent display system 100 can be executed through loading a computer program product to a computer. In step S100, the detection unit 131 obtains at least one detection content Md from the information capturing assembly 110. The at least one detection content Md is, for example, at least one front side detection content obtained in front of the transparent display 120 or at least one back side detection content obtained behind the transparent display 120. The front side detection content and the back side detection content are, for example, two different images. Alternatively, the at least one detection content Md is, for example, a plurality of wide-angle detection contents obtained simultaneously in front of and behind the transparent display 120. Each of the wide-angle detection contents is, for example, a wide-angle image. Later, various implementations will be illustrated separately with diagrams.

Then, in step S110, the detection unit 131 detects the at least one user P1 in front of the transparent display 120 and the at least one target object O1 behind the transparent display 120 according to the detection content Md. The detection unit 131 mainly detects the presence of the user P1 and/or the target object O1.

Then, in step S120, the resource allocation unit 132 obtains the resource allocation RA according to a detection result DR of the detection content Md. The resource allocation RA is, for example, setting the frame rate, the frequency and the area for the image recognition/the information recognition, or setting the switching of the information capturing assembly 110, etc. The various embodiments will be illustrated separately via drawings.

Next, in step S130, the information capturing assembly 110 obtains at least one recognition content Mr according to the resource allocation RA, and the recognition unit 133 recognizes at least one front side position Lf1 of the at least one user P1 and at least one back side position Lb1 of the at least one target object O1 according to the resource allocation RA. The at least one recognition content Mr is, for example, at least one front side recognition content obtained in front of the transparent display 120 or at least one back side recognition content obtained behind the transparent display 120. Alternatively, the at least one recognition content Mr may be, for example, a plurality of wide-angle recognition contents obtained in front of and behind of the transparent display 120 at the same time. For example, the recognition content Mr and the detection content Md are captured by the same image capturing unit; or, for example, the recognition content Mr and the detection content Md are captured by different image capturing units or different types of devices. The various embodiments will be illustrated separately through drawings. The front side position Lf1 is a position corresponded to the recognition content Mr which has not yet corresponded to the entire transparent display 120; the back side position Lb1 is a position corresponded to the recognition content Mr which has not yet corresponded to the entire transparent display 120.

Then, in step S140, the joining unit 134 joints the front side positions Lf1 and joins the back side positions Lb1 to respectively obtain a plurality of front side relative positions Lf1' and a plurality of back side relative positions Lb1'. The front side relative position Lf1' is a position corresponded to the entire transparent display 120; the back side relative position Lb1' is a position corresponded to the entire transparent display 120.

In an embodiment, the user P1 and/or the target object O1 are certainly located within the processing range of the information capturing assembly 110 (for example, the information capturing assembly 110 is a single image capturing unit, a single infrared sensor or a single radar sensor), and the step S140 can be omitted. This means that there is no need to joint, and the front side position Lf1 and/or back side position Lb1 already correspond to the entire transparent display 120.

Next, in step S150, the integrating unit 135 integrates the at least one front side relative position Lf1' and the at least one back side relative position Lb1' to obtain at least one sight position LS1. The integrating unit 135 integrates the coordinate systems of the front side relative position Lf1' and the back side relative position Lb1' to analyze the sight position LS1 on the transparent display 120 based on the connection line connected the front side relative position Lf1' and the back side relative position Lb1'.

Then, in step S160, the outputting unit 136 outputs at least one display content DI1 to the transparent display 120 according to the at least one sight position LS1. In one embodiment, a storage unit 137 may be further included, and the storage unit 137 is used to store various information. For example, the display content DI1 may be stored in the storage unit 137.

In the above step S120, the resource allocation RA is, for example, setting the frame rate, the frequency or the area of image recognition/information recognition, or setting the switching of the information capturing assembly 110, etc. The various embodiments will be illustrated through drawings.

Figure 3:
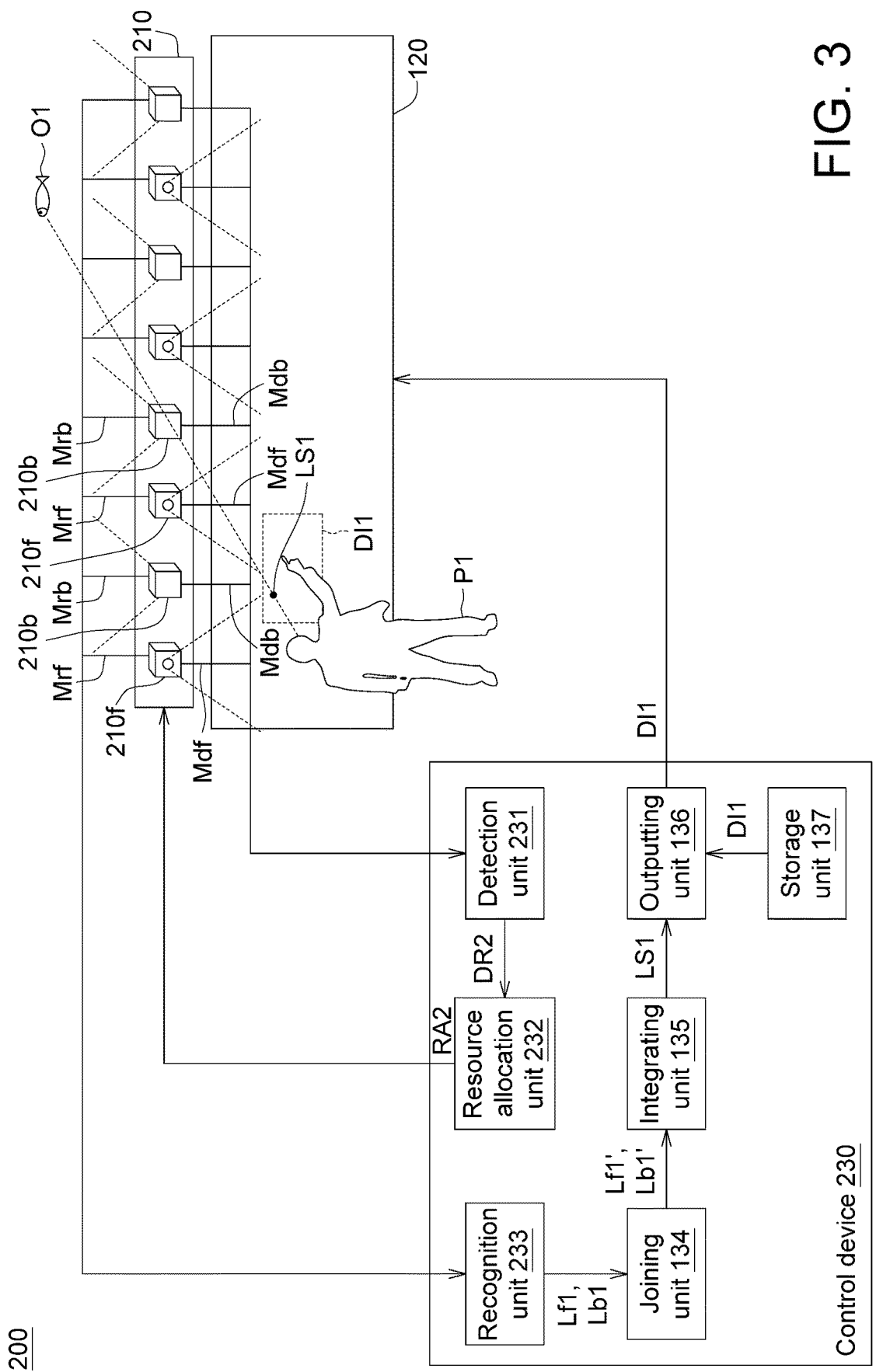
FIG. 3 shows a schematic diagram of a transparent display system according to an embodiment.

Please refer to FIG. 3, which shows a schematic diagram of a transparent display system 200 according to an embodiment. In the embodiment of FIG. 3, the information capturing assembly 210 of the transparent display system 200 includes a plurality of front side image capturing units 210f and a plurality of back side image capturing units 210*b*. These front side image capturing units 210*f* can be used to capture the front side detection contents Mdf and the front side recognition contents Mrf. These back side image capturing unit 210*b* are used to capture the back side detection contents Mdb and the back side recognition contents Mrb.

Figure 4:
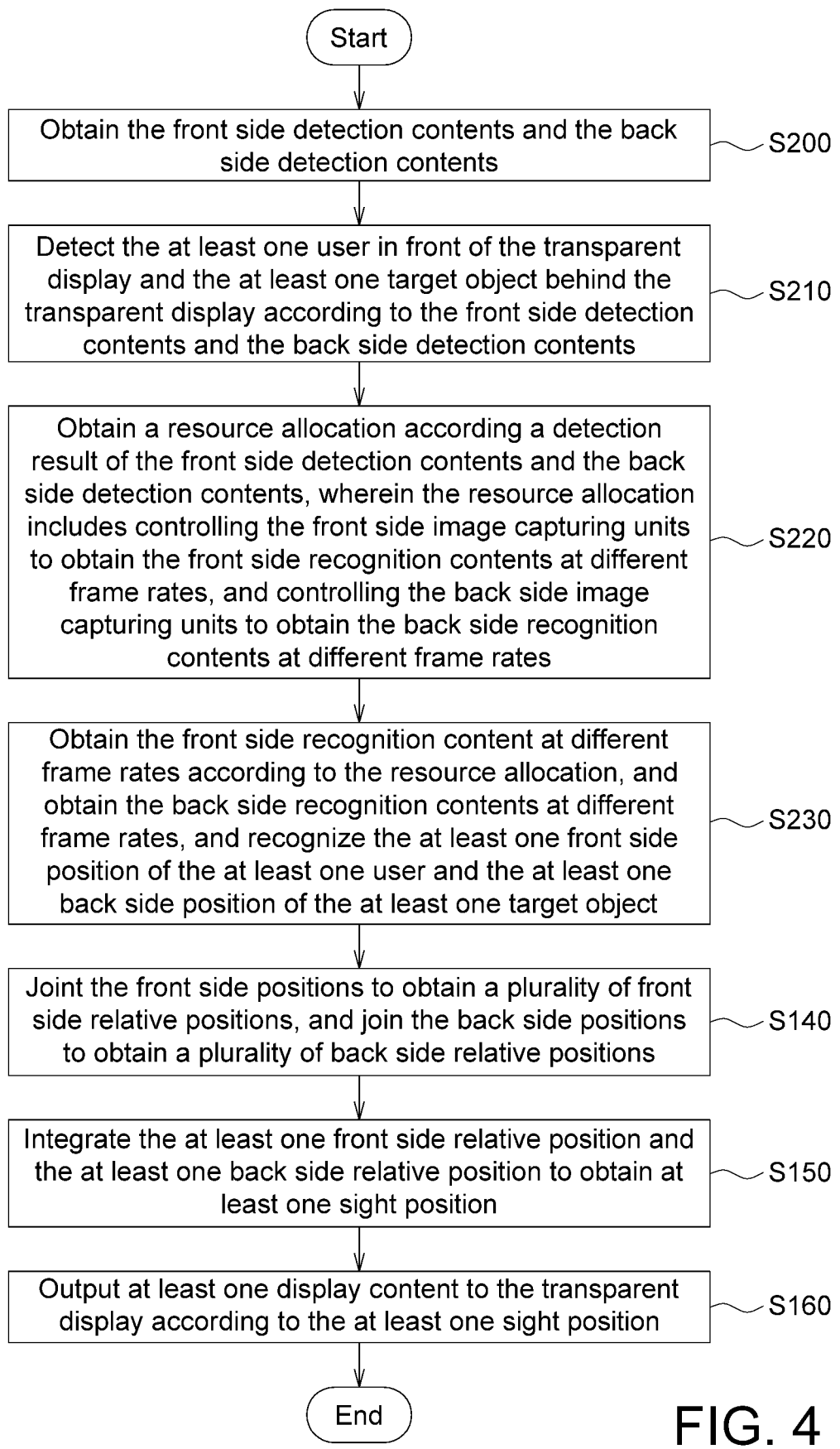
FIG. 4 shows a flowchart of a control method of the transparent display system according to an embodiment.

Please refer to FIG. 4, which shows a flowchart of a control method of the transparent display system 200 according to an embodiment. In step S200, the detection unit 231 of the control device 230 obtains the front side detection contents Mdf and the back side detection contents Mdb from the information capturing assembly 210.

Next, in step S210, the detection unit 231 detects the at least one user P1 in front of the transparent display 120 and the at least one target object O1 behind the transparent display 120 according to the front side detection contents Mdf and the back side detection contents Mdb.

Then, in step S220, the resource allocation unit 232 obtains a resource allocation RA2 according a detection result DR2 of the front side detection contents Mdf and the back side detection contents Mdb. The resource allocation RA2 includes controlling the front side image capturing units 210*f* to obtain the front side recognition contents Mrf at different frame rates, and controlling the back side image capturing units 210*b* to obtain the back side recognition contents Mrb at different frame rates.

Next, in step S230, the information capturing assembly 210 obtains the front side recognition contents Mrf at different frame rates according to the resource allocation RA2, and obtains the back side recognition contents Mrb at different frame rates, and the recognition unit 233 recognizes the at least one front side position Lf1 of the at least one user P1 and the at least one back side position Lb1 of the at least one target object O1. For example, as shown in FIG. 3, the user P1 is detected in the first from the left of the front side detection contents Mdf, so the first from the left of the front side image capturing units 210*f* obtains the front side recognition content Mrf at a higher frame rate, and the others of the front side image capturing units 210*f* obtain the front side recognition contents Mrf at a lower frame rate. As shown in FIG. 3, the target object O1 is detected in the third from the left of the back side detection contents Mdb, so the third from the left of the back side image capturing units 210*b* obtains the back side recognition content Mdb at a higher frame rate, and the others of the back side image capturing units 210*b* obtain the back side recognition contents Mrb at a lower frame rate.

Then, the process proceeds to the step S140. The subsequent steps S140 to S160 are the same as those of the aforementioned FIG. 2, which will not be repeated here.

Figure 5:
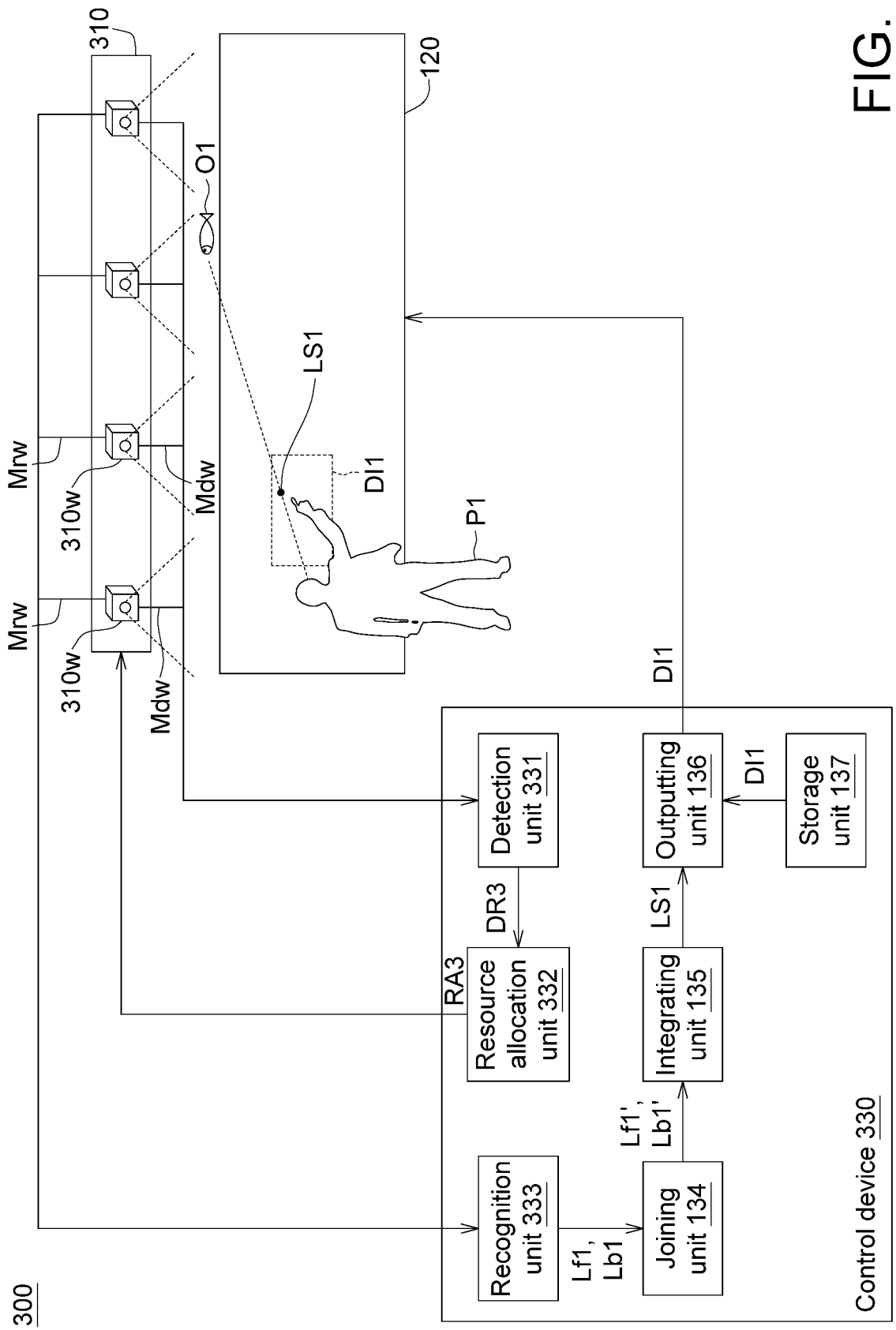
FIG. 5 shows a schematic diagram of a transparent display system according to an embodiment.

Please refer to FIG. 5, which shows a schematic diagram of a transparent display system 300 according to an embodiment. In the embodiment of FIG. 5, the information capturing assembly 310 of the transparent display system 300 includes at least one wide-angle image capturing unit 310*w*. The wide-angle image capturing unit 310*w* is used for capturing the wide-angle detection content Mdw and the wide-angle recognition content Mrw. The detection range of the wide-angle detection content Mdw covers the front side of transparent display 120 and the back side of transparent display 120. The image capturing range of the wide-angle recognition content Mrw covers the front side of transparent display 120 and the back side of the transparent display 120.

Figure 6:
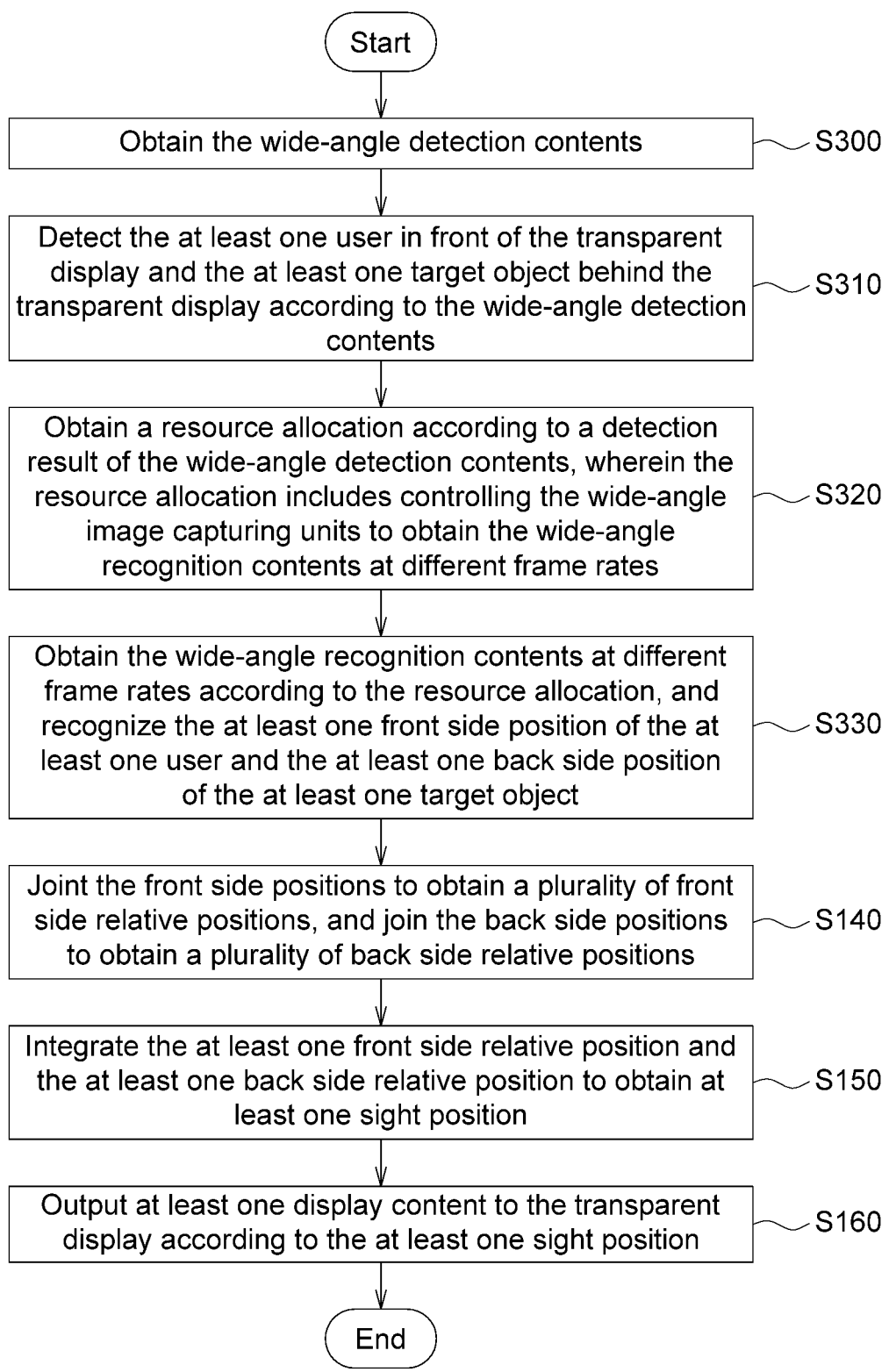
FIG. 6 shows a flowchart of a control method of the transparent display system according to an embodiment.

Please refer to FIG. 6, which shows a flowchart of a control method of the transparent display system 300 according to an embodiment. In step S300, the detection unit 331 of the control device 330 obtains the wide-angle detection contents Mdw from the information capturing assembly 310.

Next, in step S310, the detection unit 331 detects the at least one user P1 in front of the transparent display 120 and the at least one target object O1 behind the transparent display 120 according to the wide-angle detection contents Mdw.

Then, in step S320, the resource allocation unit 332 obtains a resource allocation RA3 according to a detection result DR3 of the wide-angle detection contents Mdw. The resource allocation RA3 includes controlling the wide-angle image capturing units 310*w* to obtain the wide-angle recognition contents Mrw at different frame rates.

Next, in step S330, the information capturing assembly 310 obtains the wide-angle recognition contents Mrw at different frame rates according to the resource allocation RA3, and the recognition unit 333 recognizes the at least one front side position Lf1 of the at least one user P1 and the at least one back side position Lb1 of the at least one target object O1. For example, as shown in FIG. 5, the user P1 is detected in the first from the left of the wide-angle detection contents Mdw, and the target object O1 is detected in the third from the left of the wide-angle detection contents Mdw, so the first from the left of the wide-angle image capturing units 310*w* and the third from the left of the wide-angle image capturing units 310*w* obtain the wide-angle recognition contents Mrw at a higher frame rate, and the others of the wide-angle image capturing units 310*w* obtain the wide-angle recognition contents Mrw at a lower frame rate.

Then, the process proceeds to step S140. The subsequent steps S140 to S160 are the same as those of the aforementioned in the FIG. 2, and the similarities will not be repeated here.

Figure 7:
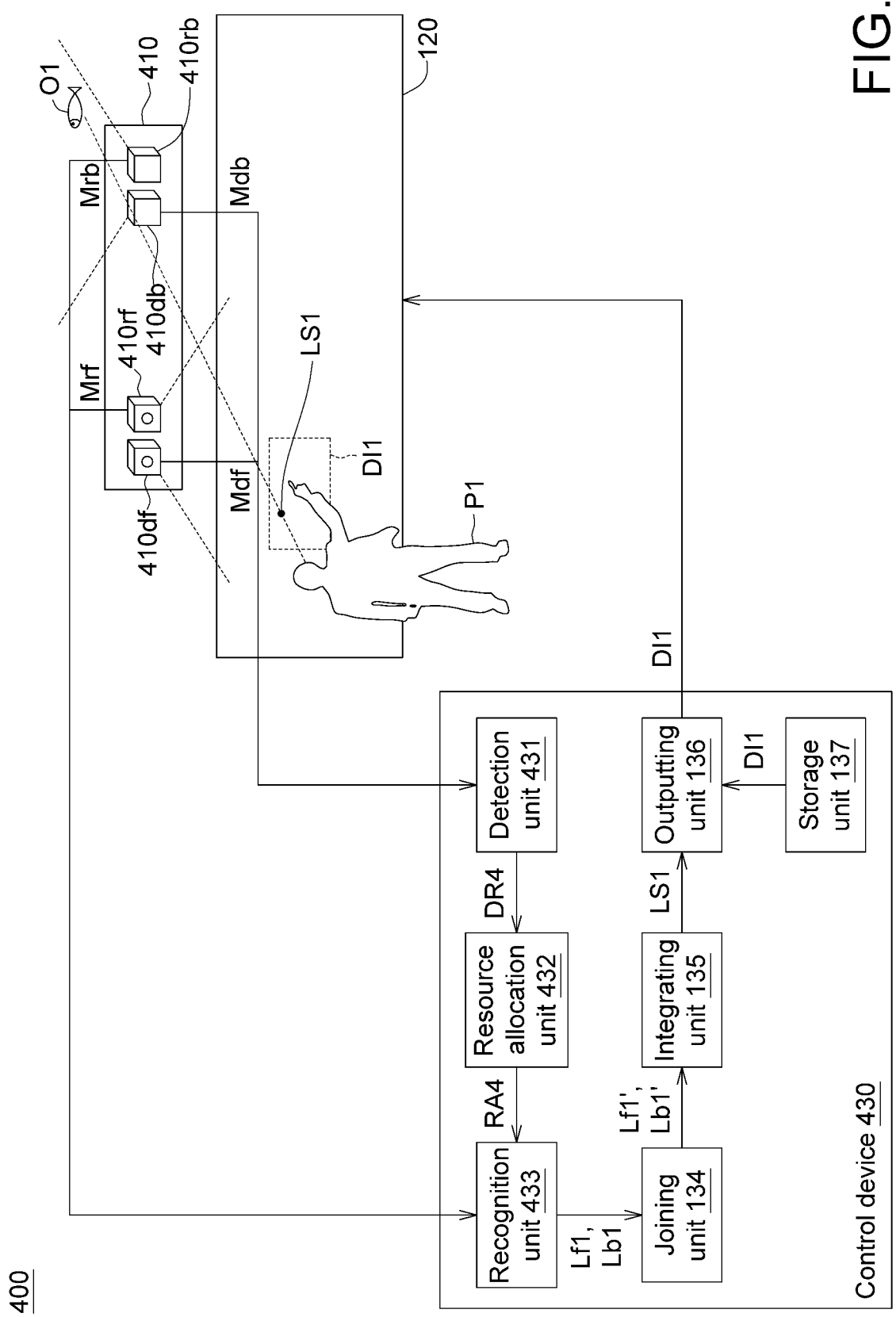
FIG. 7 shows a schematic diagram of a transparent display system according to an embodiment.

Please refer to FIG. 7, which shows a schematic diagram of a transparent display system 400 according to an embodiment. In the embodiment of FIG. 7, the information capturing assembly 410 of the transparent display system 400 includes a front side detection information capturing unit 410*df*, a back side detection information capturing unit 410*db*, a front side recognition information capturing unit 410*rf* and a back side recognition information capturing unit 410*rb*. The front side detection information capturing unit 410*df* is used to capture the front side detection content Mdf. The back side detection information capturing unit 410*db* is used to capture the back side detection content Mdb. The front side recognition information capturing unit 410*rf* is used to capture the front side recognition content Mrf. The back side recognition information capturing unit 410*rb* is used to capture the back side recognition content Mrb. The front side detection information capturing unit 410*df*, the back side detection information capturing unit 410*db*, the front side recognition information capturing unit 410*rf* and the back side recognition information capturing unit 410*rb* are, for example, image capturing devices. A resolution of the front side detection information capturing unit 410*df* is lower than a resolution of the front side recognition information capturing unit 410*rf*. A resolution of the back side detection information capturing unit 410*db* is lower than a resolution of the back side recognition information capturing unit 410*rb*.

That is, the front side detection information capturing unit 410*df* and back side detection information capturing unit 410*db* having low resolution are used to detect the presence of the user P1 or the target object O1. The front side recognition information capturing unit 410*rf* and the back side recognition information capturing unit 410*rb* having high resolution can be used to recognize the location of the user P1 or the target object O1.

In one embodiment, a wide-angle detection information capturing unit and/or a wide-angle recognition information capturing unit can be adopted. The detection range and/or the image capturing range of the wide-angle detection content and/or the wide-angle recognition content can cover the front side and the back side of the transparent display 120.

Figure 8:
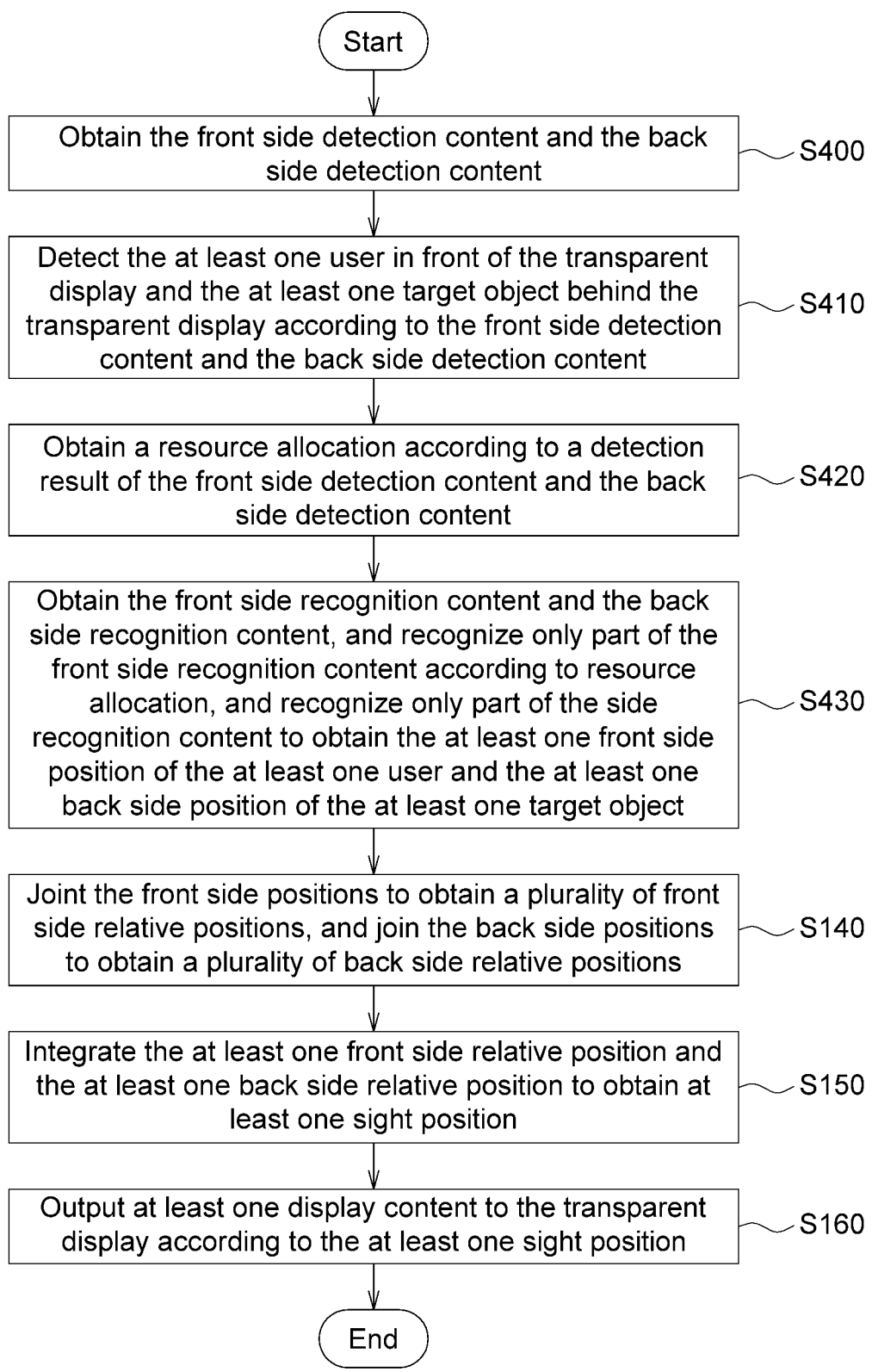
FIG. 8 shows a flowchart of a control method of the transparent display system according to an embodiment.

Please refer to FIG. 8, which shows a flowchart of a control method of the transparent display system 200 according to an embodiment. In step S400, the detection unit 431 of the control device 430 obtains the front side detection content Mdf and the back side detection content Mdb from the information capturing assembly 410.

Next, in step S410, the detection unit 431 detects the at least one user P1 in front of the transparent display 120 and the at least one target object O1 behind the transparent display 120 according to the front side detection content Mdf and the back side detection content Mdb.

Then, in step S420, the resource allocation unit 432 obtains a resource allocation RA4 according to a detection result DR4 of the front side detection content Mdf and the back side detection content Mdb. In the embodiment of FIG. 7, the resource allocation RA4 is transmitted to the recognition unit 433.

Next, in step S430, the information capturing assembly 410 obtains the front side recognition content Mrf and the back side recognition content Mrb, and the recognition unit 433 recognizes part of the front side recognition content Mrf according to resource allocation RA4, and recognizes part of the side recognition content Mrb to obtain the at least one front side position Lf1 of the at least one user P1 and the at least one back side position Lb1 of the at least one target object O1.

Figure 9:
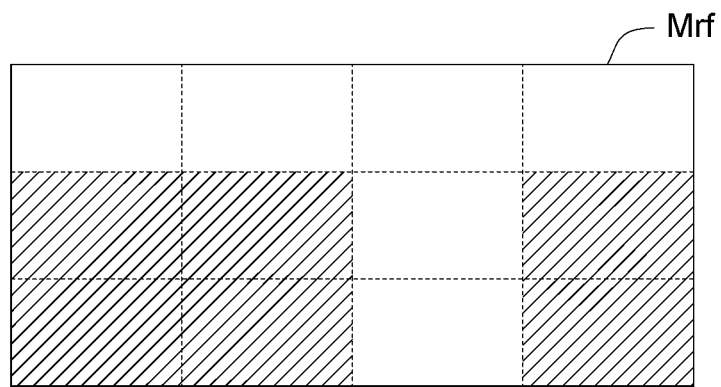
FIG. 9 shows the front side recognition content according to an embodiment.

For example, please refer to FIG. 9, which shows the front side recognition content Mrf according to an embodiment. Under the resource allocation RA4, only the oblique line area of the front side recognition content Mrf is recognized to improve the recognition efficiency.

Then, the process proceeds to step S140. The subsequent steps S140 to S160 are the same as the content of the aforementioned FIG. 2, which will not be repeated here.

Figure 10:
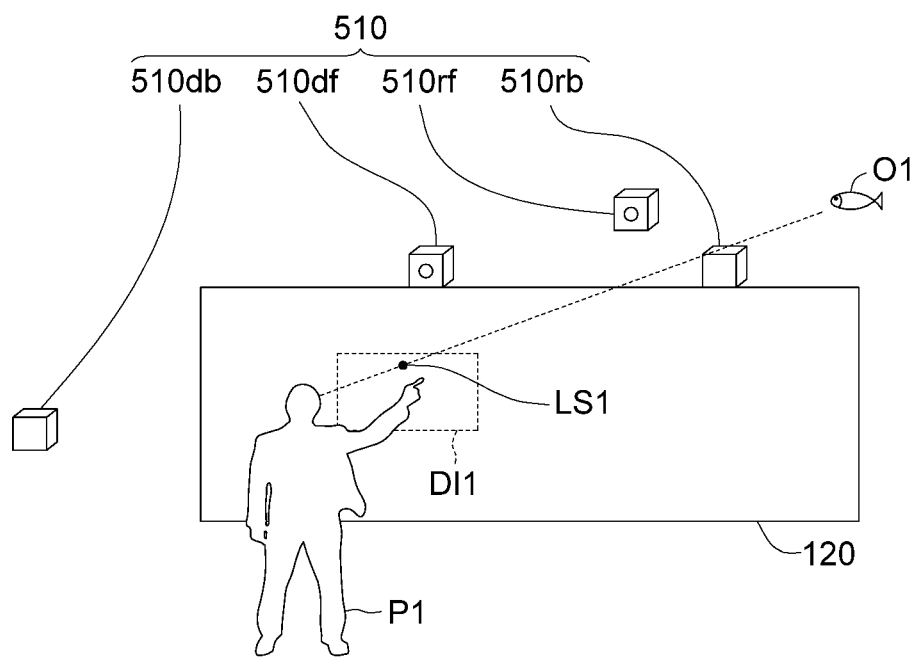
FIG. 10 shows a schematic diagram of a transparent display system according to an embodiment.

Please refer to FIG. 10, which shows a schematic diagram of a transparent display system 500 according to an embodiment. In the embodiment of FIG. 10, the information capturing assembly 510 of the transparent display system 500 includes a front side detection information capturing unit 510df, a back side detection information capturing unit 510db, a front side recognition information capturing unit 510rf, and a back side recognition information capturing unit 510rb. The front side detection information capturing unit 510df, the back side detection information capturing unit 510db, the front side recognition information capturing unit 510rf and the back side recognition information capturing unit 510rb are, for example, image capturing devices. A resolution of the front side detection information capturing unit 510df is lower than a resolution of the front side recognition information capturing unit 510rf, and the detection range of the front side detection information capturing unit 510df may be different from the image capturing range of the front side recognition information capturing unit 510rf. A resolution of the back side detection information capturing unit 510db is lower than a resolution of the back side recognition information capturing unit 510rb, and the detection range of the back side detection information capturing unit 510db can be different from the image capturing range of the back side recognition information capturing unit 510rb.

That is, the front side detection information capturing unit 510df and the back side detection information capturing unit 510db having low resolution are used to detect the presence of the user P1 or the target object O1. The front side recognition information capturing unit 510rf and the back side recognition information capturing unit 510rb having high resolution can be used to recognize the position of the user P1 or the target object O1. The front side detection information capturing unit 510df and the front side recognition information capturing unit 510rf can be disposed at different places, and the back side detection information capturing unit 510db and the back side recognition information capturing unit 510rb can be disposed at different places, and then the information will be aligned later.

In one embodiment, the wide-angle detection information capturing unit having low resolution and the wide-angle recognition information capturing unit having high resolution, the wide-angle detection information capturing unit having low resolution and the wide-angle recognition information capturing unit having high resolution can be disposed set in different places.

Figure 11:
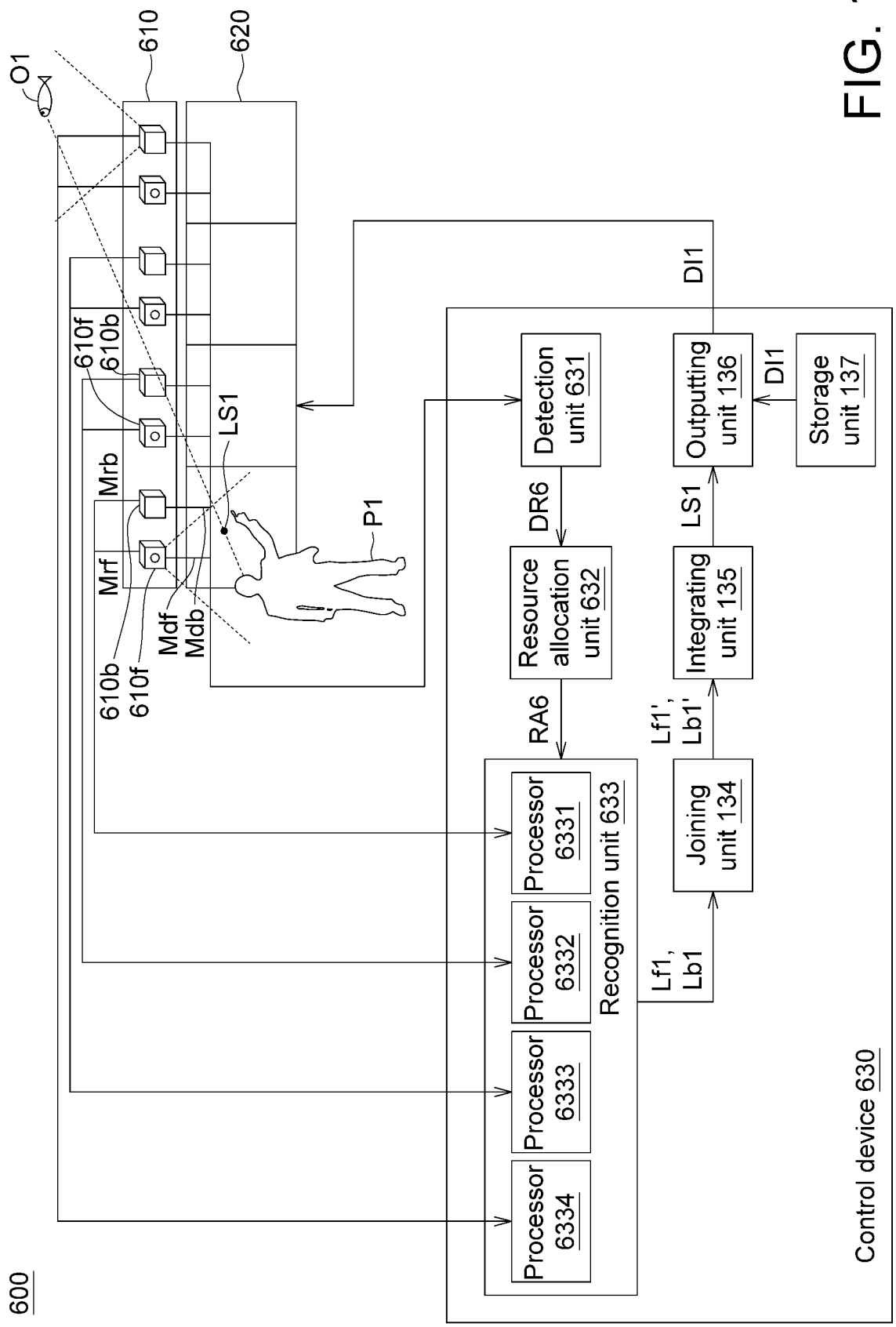
FIG. 11 shows a schematic diagram of a transparent display system according to an embodiment.

Please refer to FIG. 11, which shows a schematic diagram of a transparent display system 600 according to an embodiment. In the embodiment of FIG. 11, the information capturing assembly 610 of the transparent display system 600 includes a plurality of front side image capturing units 610f and a plurality of back side image capturing units 610b. These front side image capturing units 610f are used to capture the front side detection contents Mdf and the front side recognition contents Mrf. These back side image capturing units 610b are used to capture the back side detection contents Mdb and the back side recognition contents Mrb.

Figure 12:
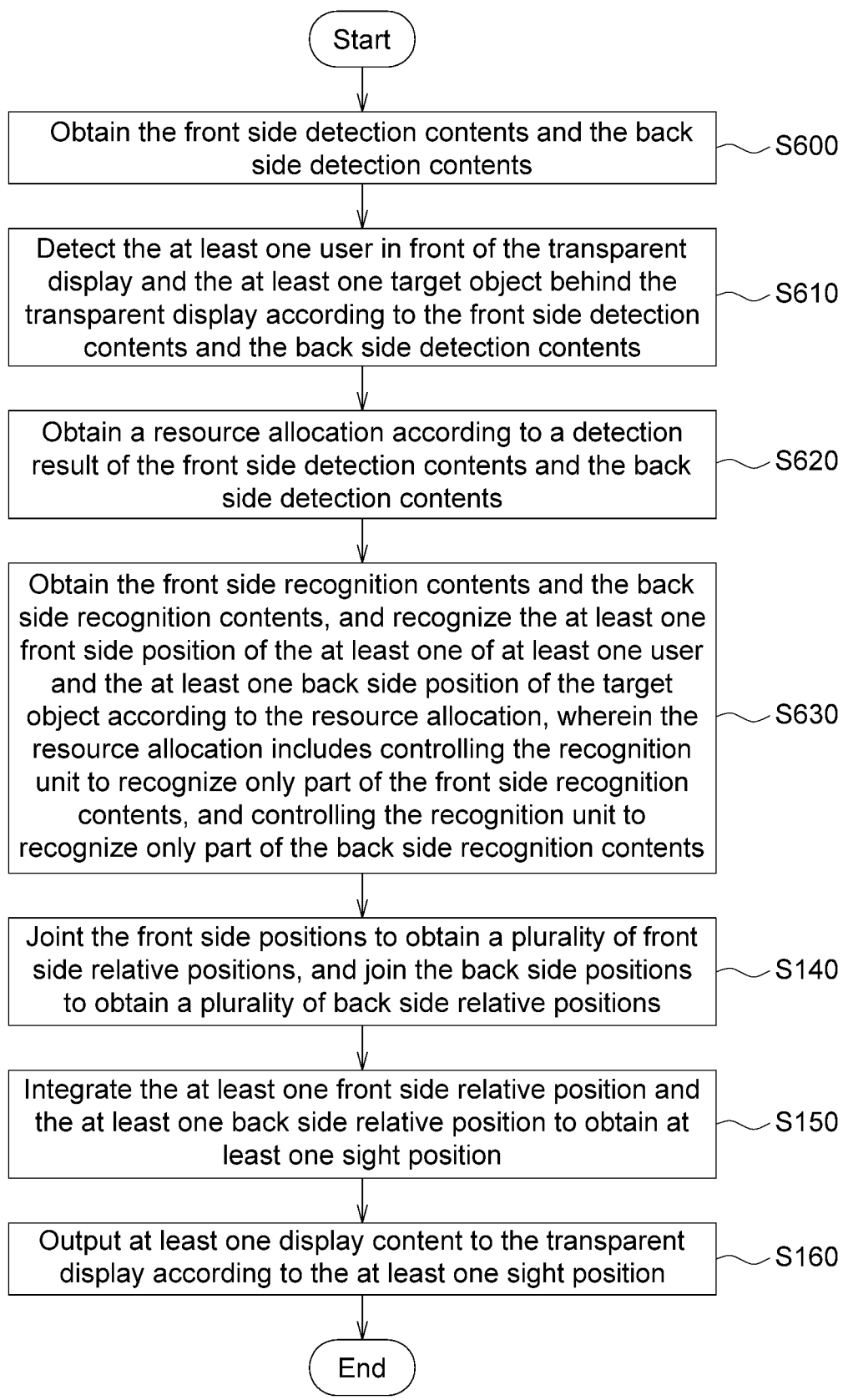
FIG. 12 shows a flowchart of a control method of the transparent display system according to an embodiment.

Please refer to FIG. 12, which shows a flowchart of a control method of the transparent display system 600 according to an embodiment. In step S600, the detection unit 631 of the control device 630 obtains the front side detection contents Mdf and the back side detection contents Mdb from the information capturing assembly 610.

Next, in step S610, the detection unit 631 detects the at least one user P1 in front of the transparent display 620 and the at least one target object O1 behind the transparent display 620 according to the front side detection contents Mdf and the back side detection contents Mdb. The transparent display 620 is, for example, composed of several display panels.

Then, in step S620, the resource allocation unit 632 obtains a resource allocation RA6 according to a detection result DR6 of the front side detection contents Mdf and the back side detection contents Mdb.

Next, in step S630, the information capturing assembly 610 obtains the front side recognition contents Mrf and the back side recognition contents Mrb, and the recognition unit 633 recognizes the at least one front side position Lf1 of the at least one of at least one user P1 and the at least one back side position Lb1 of the target object O1 according to the resource allocation RA6. The resource allocation RA6 includes controlling the recognition unit 633 to recognize part of the front side recognition contents Mrf, and controlling the recognition unit 633 to recognize part of the back side recognition contents Mrb. For example, the recognition unit 633 may include several processors 6331 to 6334. As shown in FIG. 11, the user P1 is detected in the first from the left of the front side detection contents Mdf, and the target object O1 is detected in the fourth from the left of the back side detection contents Mdb, so the first processor 6331 recognizes the front side recognition content Mrf, the fourth processor 6334 recognizes the back side recognition content Mrb, and the remaining processors 6332 and 6333 do not recognize.

Then, the process proceeds to step S140. The subsequent steps S140 to S160 are the same as those of the aforementioned FIG. 2, which will not be repeated here.

Figure 13:
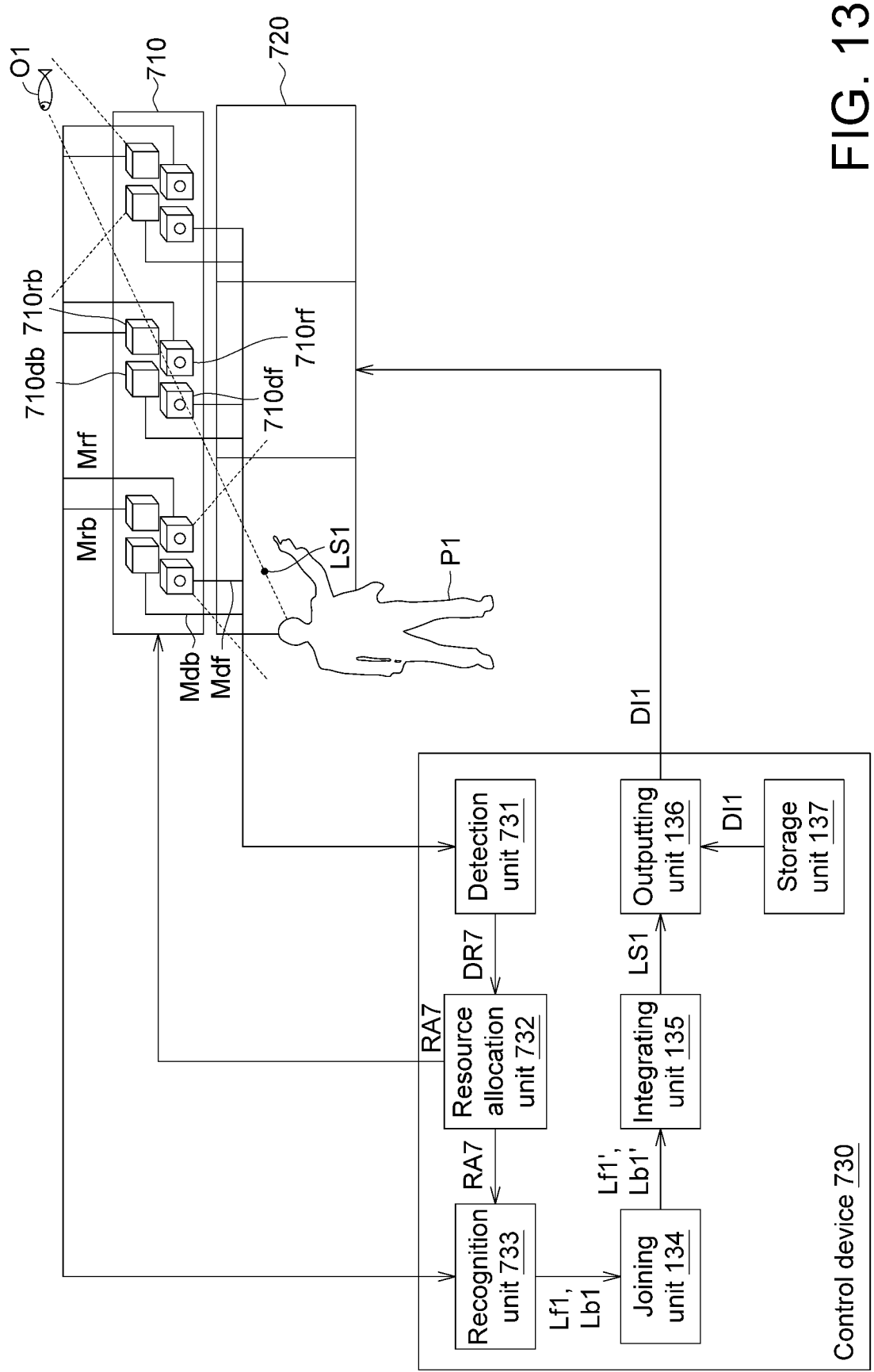
FIG. 13 shows a schematic diagram of a transparent display system according to an embodiment.

Please refer to FIG. 13, which shows a schematic diagram of a transparent display system 700 according to an embodiment. In the embodiment of FIG. 13, the information capturing assembly 710 of the transparent display system 700 includes a plurality of front side detection information capturing units 710df, a plurality of back side detection information capturing units 710db, a plurality of front side recognition information capturing units 710rf and a plurality of back side recognition information capturing unit 710rb. The front side detection information capturing units 710df are used to capture the front side detection contents Mdf. The back side detection information capturing units 710db are used to capture the back side detection contents Mdb. The front side recognition information capturing units 710rf are used to capture the front side recognition contents Mrf. The back side recognition information capturing units 710rb are used to capture the back side recognition contents Mrb. The front side detection information capturing units 710df, the back side detection information capturing units 710db, the front side recognition information capturing units 710rf and the back side recognition information capturing units 710rb are, for example, image capturing devices. A resolution of the front side detection information capturing unit 710df is lower than a resolution of the front side recognition information capturing unit 710rf. A resolution of the back side detection information capturing unit 710db is lower than a resolution of the back side recognition information capturing unit 710rb.

In other words, the front side detection information capturing units 710df and the back side detection information capturing units 710db having low resolution are used to detect the presence of the user P1 or the target object O1. The front side recognition information capturing units 710rf and the back side recognition information capturing units 710rb having high resolution can be used to recognize the location of the user P1 or the target object O1.

Figure 14:
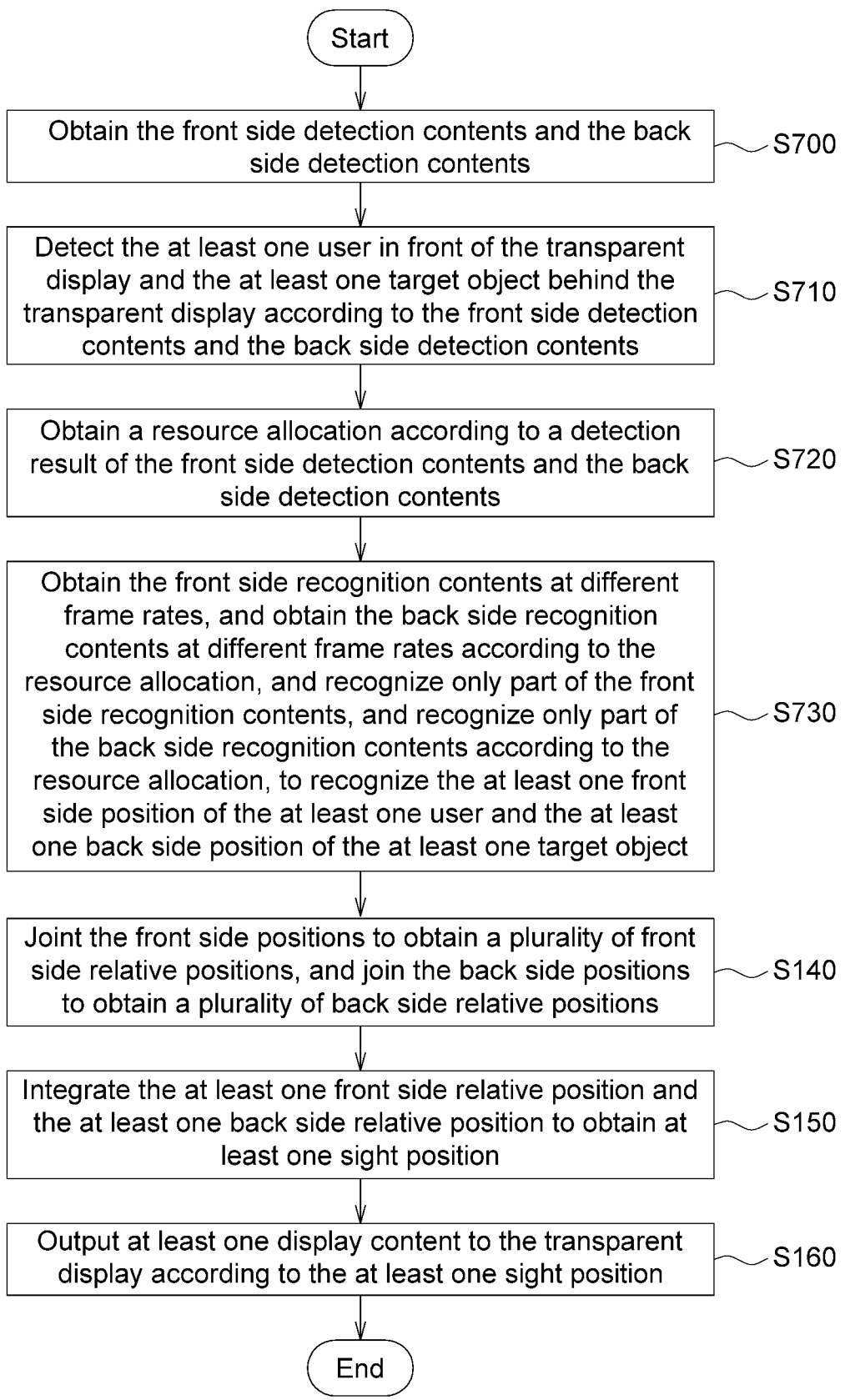
FIG. 14 shows a flowchart of a control method of the transparent display system according to an embodiment.

Please refer to FIG. 14, which shows a flowchart of a control method of the transparent display system 700 according to an embodiment. In step S700, the detection unit 731 obtains the front side detection contents Mdf and the back side detection contents Mdb from the information capturing assembly 710.

Next, in step S710, the detection unit 731 detects the at least one user P1 in front of the transparent display 720 and the at least one target object O1 behind the transparent display 120 according to the front side detection contents Mdf and the back side detection contents Mdb. The transparent display 720 is, for example, composed of multiple display panels.

Then, in step S720, the resource allocation unit 732 obtains a resource allocation RA7 according to a detection result DR7 of the front side detection contents Mdf and the back side detection contents Mdb. In one embodiment, the resource allocation RA4 can be transmitted to the information capturing assembly 710 and the recognition unit 733 at the same time.

Next, in step S730, the information capturing assembly 410 obtains the front side recognition contents Mrf at different frame rates, and obtains the back side recognition contents Mrb at different frame rates according to the resource allocation RA7, and the recognition unit 733 recognizes part of the front side recognition contents Mrf, and recognizes part of the back side recognition contents Mrb according to the resource allocation RA7, to recognize the at least one front side position Lf1 of the at least one user P1 and the at least one back side position Lb1 of the at least one target object O1.

For example, as shown in FIG. 13, the user P1 is detected in the first from the left of the front side detection contents Mdf, and the target object O1 is detected in the third from the left of the back side detection contents Mdb, so the first from the left of the front side recognition information capturing units 710rf and the third from the left of the back side recognition information capturing units 710rb obtain the front side recognition content Mrf and the back side recognition content Mrb at a higher frame rate, and the others of the front side recognition information capturing units 710rf and the back side recognition information capturing units 710rb obtain the front side recognition contents Mrf and the back side recognition contents Mrb at a lower frame rate.

In addition, under the resource allocation RA7, part of the front side recognition content Mrf and the back side recognition content Mrb can be recognize to improve the efficiency of recognition.

Then, the process proceeds to step S140. The subsequent steps S140 to S160 are the same as those of the aforementioned FIG. 2, which will not be repeated here.

According to the various embodiments described above, the transparent display system can use the resource allocation technology to allocate information capturing assembly processing resources, or use the resource allocation technology to allocate internal processing resources of the control device to reduce overall processing resource consumption.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A transparent display system, comprising:
    an information capturing assembly, configured to obtain at least one detection content;
    a transparent display; and
    a control device, comprising:
        a detection unit, configured to detect at least one user in front of the transparent display and at least one target object behind the transparent display according to the at least one detection content;
        a resource allocation unit, configured to obtain a resource allocation according to a detection result of the at least one detection content that is a presence of the user or the target object, wherein the resource allocation comprises setting different frame rates, different frequencies or different areas for image recognition or information recognition, or setting different switching conditions of the information capturing assembly; and
        a recognition unit, wherein the information capturing assembly obtains at least one recognition content according to the resource allocation, and the recognition unit obtains at least one front side position of the at least one user and at least one back side position of the at least one target object according to the resource allocation.

2. The transparent display system according to claim 1, wherein the control device further comprising:
    a joining unit, configured to join the at least one front side position and join the at least one back side position to respectively obtain at least one front side relative position and at least one back side relative position;
    an integrating unit, configured to integrate the at least one front side relative position and the at least one back side relative position to obtain at least one sight position; and
    an outputting unit, configured to output at least one display content to the transparent display according to the at least one sight position.

3. The transparent display system according to claim 1, wherein the at least one detection content includes a plurality of front side detection contents and a plurality of back side detection contents, the at least one recognition content includes a plurality of front side recognition contents and a plurality of back side recognition contents, and the information capturing assembly includes:
    a plurality of front side image capturing units, configured to capture the front side detection contents and the front side recognition contents; and
    a plurality of back side image capturing units, configured to capture the back side detection contents and the back side recognition contents.

4. The transparent display system according to claim 3, wherein the resource allocation includes controlling the front side image capturing units to obtain the front side recognition contents at different frame rates, and controlling the back side image capturing units to obtain the back side recognition contents at different frame rates.

5. The transparent display system according to claim 3, wherein the resource allocation includes controlling the recognition unit to recognize part of the front side recognition contents, and controlling the recognition unit to recognize part of the back side recognition contents.

6. The transparent display system according to claim 1, wherein the at least one detection content includes a plurality of wide-angle detection contents, the at least one recognition content includes a plurality of wide-angle recognition contents, each of the wide-angle detection contents covers front side of the transparent display and front side of the transparent display, each of the wide-angle recognition contents covers front side of the transparent display and front side of the transparent display, and the information capturing assembly includes:
    a plurality of wide-angle image capturing units, configured to capture the wide-angle detection contents and the wide-angle recognition contents.

7. The transparent display system according to claim 6, wherein the resource allocation includes controlling the wide-angle image capturing units to obtain the wide-angle recognition contents at different frame rates.

8. The transparent display system according to claim 1, wherein the at least one detection content includes a front side detection content and a back side detection content, the at least one recognition content includes a front side recognition content and a back side recognition content, and the information capturing assembly includes:
    a front side detection information capturing unit, configured to capture the front side detection content;
    a back side detection information capturing unit, configured to capture the back side detection content;
    a front side recognition information capturing unit, configure to capture the front side recognition content, wherein a resolution of the front side detection information capturing unit is lower than a resolution of the front side recognition information capturing unit; and
    a back side recognition information capturing unit, configured to capture the back side recognition content, wherein a resolution of the back side detection information capturing unit is lower than a resolution of the back side recognition information capturing unit, and the resource allocation includes controlling the recognition unit to recognize part of the front side recognition content and controlling the recognition unit to recognize part of the front side recognition content.

9. The transparent display system according to claim 1, wherein the at least one detection content includes a front side detection content and a back side detection content, the at least one recognition content includes a front side recognition content and a back side recognition content, and the information capturing assembly includes:
    a front side detection information capturing unit, configured to capture the front side detection content;
    a back side detection information capturing unit, configured to capture the back side detection content;
    a front side recognition information capturing unit, configured to capture the front side recognition content, wherein a resolution of the front side detection information capturing unit is lower than a resolution of the front side recognition information capturing unit, and a detection range of the front side detection information capturing unit is different from an image capturing range of the front side recognition information capturing unit; and
    a back side recognition information capturing unit, configured to capture the back side recognition content, wherein a resolution of the back side detection information capturing unit is lower than a resolution of the back side recognition information capturing unit, and a detection range of the back side detection information capturing unit is different from an image capturing range of the back side recognition information capturing unit.

10. A control method of a transparent display system, comprising:
    detecting at least one user in front of a transparent display and at least one target object behind the transparent display according to at least one detection content;
    obtaining a resource allocation according to a detection result of the at least one detection content that is a presence of the user or the target object, wherein the resource allocation comprises setting different frame rates, different frequencies or different areas for image recognition or information recognition, or setting different switching conditions of the information capturing assembly; and
    obtaining at least one recognition content and recognizing at least one front side position of the at least one user and at least one back side position of the at least one target object according to the resource allocation.

11. The control method of the transparent display system according to claim 10, further comprising:
    joining the at least one front side position and joining the at least one back side position to respectively obtain at least one front side relative position and at least one back side relative position;
    integrating the at least one front side relative position and the at least one back side relative position to obtain at least one sight position; and
    outputting at least one display content to the transparent display according to the at least one sight position.

12. The control method of the transparent display system according to claim 10, wherein the at least one detection content includes a plurality of front side detection contents and a plurality of back side detection contents, the at least one recognition content includes a plurality of front side recognition contents and a plurality of back side recognition contents.

13. The control method of the transparent display system according to claim 12, wherein the resource allocation includes obtaining the front side recognition contents at different frame rates, and obtaining the back side recognition contents at different frame rates.

14. The control method of the transparent display system according to claim 12, wherein the resource allocation includes recognizing part of the front side recognition contents, and recognizing part of the back side recognition contents.

15. The control method of the transparent display system according to claim 10, wherein the at least one detection content includes a plurality of wide-angle detection contents, the at least one recognition content includes a plurality of wide-angle recognition contents, each of the wide-angle detection contents covers front side of the transparent display and front side of the transparent display, and each of the wide-angle recognition contents covers front side of the transparent display and front side of the transparent display.

16. The control method of the transparent display system according to claim 15, wherein the resource allocation includes obtaining the wide-angle recognition contents at different frame rates.

17. The control method of the transparent display according to claim 10, wherein the at least one detection content includes a front side detection content and a back side detection content, the at least one recognition content includes a front side recognition content and a back side recognition content, and a resolution of the front side detection content is lower than a resolution of the front side recognition content, a resolution of the back side detection content is lower than a resolution of the back side recognition content, and the resource allocation includes recognizing part of the front side recognition content and recognizing part of the back side recognition content.

18. The control method of the transparent display system according to claim 10, wherein the at least one detection content includes a front side detection content and a back side detection content, the at least one recognition content includes a front side recognition content and a back side recognition content, a resolution of the front side detection content is lower than a resolution of the front side recognition content, a resolution of the back side detection content is lower than a resolution of the back side recognition content, a detection range of the front side detection content is different from an image capturing range of the front side recognition content, and a detection range of the back side detection content is different from an image capturing range of the back side recognition content.

19. A control device, comprising:
   a detection unit, configured to detect at least one user in front of the transparent display and at least one target object behind the transparent display according to the at least one detection content;
   a resource allocation unit, configured to obtain a resource allocation according to a detection result of the at least one detection content that is a presence of the user or the target object, wherein the resource allocation comprises setting different frame rates, different frequencies or different areas for image recognition or information recognition, or setting different switching conditions of the information capturing assembly; and
   a recognition unit, wherein the information capturing assembly obtains at least one recognition content according to the resource allocation, and the recognition unit obtains at least one front side position of the at least one user and at least one back side position of the at least one target object according to the resource allocation.

* * * * *